(12) United States Patent
Parker

(10) Patent No.: US 9,753,049 B1
(45) Date of Patent: Sep. 5, 2017

(54) COLLINEAR SYSTEM TO DETERMINE ITS OWN DISPLACEMENT FROM ITS OWN MOTION

(71) Applicant: Non-Inertial Technology, LLC, Rochester, NY (US)

(72) Inventor: Val Parker, Pittsford, NY (US)

(73) Assignee: NON-INERTIAL TECHNOLOGY, LLC, Rochester, NY (US)

( * ) Notice: Subject to any disclaimer, the term of this patent is extended or adjusted under 35 U.S.C. 154(b) by 0 days.

(21) Appl. No.: 14/477,945

(22) Filed: Sep. 5, 2014

Related U.S. Application Data

(60) Provisional application No. 61/959,903, filed on Sep. 6, 2013.

(51) Int. Cl.
    *G01B 11/14* (2006.01)
    *G01P 3/36* (2006.01)

(52) U.S. Cl.
    CPC .............. *G01P 3/36* (2013.01); *G01B 11/14* (2013.01)

(58) Field of Classification Search
    CPC .......... G01C 21/12; G01C 23/00; G01P 3/68; B60Q 1/54
    USPC ................... 356/614, 615, 639, 601
    See application file for complete search history.

(56) References Cited

U.S. PATENT DOCUMENTS

| | | | | |
|---|---|---|---|---|
| 5,467,186 A * | 11/1995 | Indo | .................. | H05K 13/08 356/150 |
| 6,118,538 A * | 9/2000 | Haugan | .............. | H05K 13/0413 250/559.34 |
| 7,187,457 B2 * | 3/2007 | Kobayashi | ......... | G01B 11/2433 250/559.12 |
| 7,746,481 B2 * | 6/2010 | Kranz | ................. | G01B 11/272 356/601 |
| 2001/0052984 A1 * | 12/2001 | Ookubo | ................ | G01D 5/285 356/614 |
| 2006/0087538 A1 * | 4/2006 | Amma | ................. | B41J 2/17553 347/86 |
| 2008/0218738 A1 * | 9/2008 | Trainer | ................. | G01B 11/08 356/72 |
| 2009/0084546 A1 * | 4/2009 | Ekseth | .................... | E21B 47/04 166/255.1 |
| 2012/0008149 A1 * | 1/2012 | Parker | ...................... | G01P 3/68 356/614 |
| 2012/0236320 A1 * | 9/2012 | Steffey | ................. | G01B 11/002 356/614 |

(Continued)

*Primary Examiner* — Tarifur Chowdhury
*Assistant Examiner* — Isiaka Akanbi
(74) *Attorney, Agent, or Firm* — Rossi, Kimms & McDowell LLP

(57) ABSTRACT

A light beam or other electromagnetic medium is emitted, guided, and received, all within a unitary system frame. The beam retains its characteristics regardless of position or motion of the frame in which it propagates. The beam retains its position in space relative to the detection of motion of the frame. Because the frame and the beam emitted within it are in the same frame of reference, characteristics of their motion are compared to determine parameters including system velocity and planetary velocity which is useful in navigation. Position, orientation, displacement, velocity of an object in motion, and changes in these parameters relative to previous values thereof, are derived from information provided within and directly by the motion of the unitary system itself.

10 Claims, 2 Drawing Sheets

(56) References Cited

U.S. PATENT DOCUMENTS

2012/0287674 A1\* 11/2012 Nichol ................. G02B 6/0018
362/611
2013/0129163 A1\* 5/2013 Chung .................. G06K 9/228
382/124

\* cited by examiner

COLLINEAR SYSTEM TO DETERMINE ITS OWN DISPLACEMENT FROM ITS OWN MOTION

CROSS-REFERENCE TO RELATED APPLICATION

My related Provisional Application No. 61/959,903 was filed on Sep. 6, 2013. That filing date is claimed for this application.

BACKGROUND OF THE INVENTION

1. Field of the Invention

This invention relates generally to onboard navigational instrumentation, and more specifically to collinear methods and apparatus for detecting and measuring position, orientation, movement, and velocity of an object in motion. These determinations are made from information provided within, and directly by, movement of the object itself relative to its initial or other previous spatial parameters. My U.S. Pat. No. 8,212,023, issued Jul. 3, 2012, is relevant here as background, of which the present invention is a substantial advance.

2. General Background

For purposes hereof, the terms "electromagnetic media", "non-inertial media", "light", "beam of light", "pulse of light", "luminous flux" are equivalent unless otherwise stated. The terms "instruments", "devices", "apparatus" are similarly equivalent. The terms "body", "object", "inertial body", "Inertial frame" are similarly equivalent. The terms "collinear", "in-line", "linearly", "rectilinear" are similarly equivalent.

References in the English measurement system are intended to include metric equivalents, and vice versa.

Prior art includes various types of apparatus for measurement of an object's location, orientation, headings, and overall motion. All such devices utilize well-established methods, summarized as follows:

Measurement of motion of an object by comparing its positions relative to other objects or within defined characteristics of the Earth or terrestrial objects. For instance, providing information on position and its rate of change via satellite triangulation (GPS, GNSS).

Measurements of location, orientation, and heading of an object via magnetic characteristics of the Earth, i.e. by magnetic compass.

Measurements of displacement of an object as a function of its acceleration. For instance, providing measurements of speed as a derivative from the accelerometer/gyro measurement of acceleration including determining changes of angular position by fiber optic and laser gyroscopes the functions of which are based on Sagnac Effect.

All of these methods have serious shortcomings, such as the need for continuous outside referencing, the lack of accuracy and consistency, and most significantly, the inability to continuously vectorize motion, i.e. they cannot provide simultaneous continuous information on speed and direction of displacement from direct onboard readings of an individual instrument.

The corpuscular-wave nature of light and its independence from inertial frames of reference due to photon's zero mass and zero electric charge (well defined and described in classic and quantum electrodynamics and special relativity) provide the basis for development of a new class of navigational instruments.

There are two well-known and technically established methods that utilize properties of light to measure displacements of an inertial body. One method is based on Michelson principles that utilize collinear propagations of light within a body which is in motion of any kind. The other is the Sagnac effect that utilizes propagations of light in a body under exclusively angular displacement. Sagnac is widely used in Fiber Optic and Laser Gyros. However, performance of gyro navigation equipment is affected by drifts, sporadic and non-linear measurements, the need for input of acceleration of gravity, and other factors. The only way to avoid those limitations or inadequacies is to avoid altogether the gyroscopic method of measurement, and replace it with measurements of collinear displacement via Michelson principles.

Advances in development of optoelectronic devices open the way for development of a new class of navigational devices that utilize collinear measurements of the displacement of a body relative to the displacement of light from within it in the measurement of the object's location, orientation, headings, and overall motion. The ability to measure terrestrial displacement of an object, relative to independent propagation of light within, it provides information about the object, relative to the Planetary axial latitudinal velocity, i.e. position, orientation, and direction of travel of the object relative to Planetary latitude and longitude from within and from the motion itself, and to graphically display such in conjunction with geographical maps and charts.

SUMMARY OF THE INVENTION

The present invention is a system to internally detect and determine its own position, orientation, and direction of a moving inertial body by measuring its displacement relative to collinear independent propagation of light within the system itself, and to display such data in conjunction with predetermined information, e.g. charts, graphs, or maps.

Advantages of this invention include its ability to provide spatial position, orientation, and headings of an inertial system, simplicity of operation, quality and stability of measurements, cost effective spatial and terrestrial navigation, independence from external information or influencdes (natural or man-made), and ability to display such in conjunction with charts, graphs, and maps.

In one embodiment, this invention apparatus includes an emitter and a receiver facing each other on an optical axis. Emitter and receiver are separated by the fixed length of a light-guide. The speed of light is constant, so the time of light travel to the receiver correlates with displacement of the apparatus from a previous position.

In another embodiment, a light beam undergoes adjustment. Optical elements to reflect and/or refract light are interposed between emitter and receiver. With motion of the apparatus, light encounters optical elements which alter the characteristics (e.g. timing, phase, frequency, modulation) of the light beam in accordance with varying position of the apparatus.

In another embodiment, emitter/receiver pairs are angularly displaced from each other, at different attitudes relative to Earth (or planetary) surface motion. Characteristics of light incident at the separate receivers are accordingly different.

In connection with this invention, information on spatial position, orientation, and direction of an inertial body is collected, analyzed, forwarded to a guidance and navigational system, and displayed in conjunction with maps and charts in various forms.

DRAWINGS

DESCRIPTION (WITH REFERENCE TO DRAWINGS)

Two principles provide the basis for this invention:
Principle (1): Light travels in space with a constant speed which is Independent of the speed of any inertial body from which the light originated;
Principle (2): The corpuscular nature of light and its independence from inertial frames of reference because of zero mass and zero electric charge of the photon.

Figure 1:
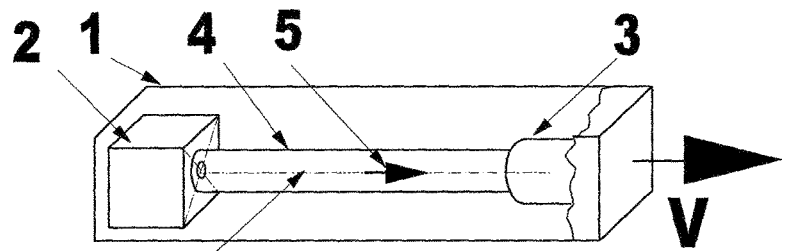
FIG. 1 shows one system of my invention, including an emitter, receiver, and connecting light guide.

In FIG. 1, a moving system 1 includes a light emitter 2, light guide 4, and light receiver 3, all aligned on an optical axis 51. The emitter 2 and receiver 3, a fixed distance apart, face each other along the axis 51. The system 1, part of an inertial body (not shown), is moving with velocity V in the direction of the optical axis 51. A light beam 5 is conducted from emitter 2, by the light guide 4, to the receiver 3. Travel time of the light beam 5 from emitter 2 to receiver 3 is correlative with the velocity V of the system. The light beam 5 between emitter 2 anti receiver 3 is not traveling in free space. It is confined within, and conducted by, the light guide 4.

Consider FIG. 1 together with Principle (1) noted above. Light beam 5 travels at the constant speed of light, regardless of velocity V of the system (and emitter). If system (and emitter) were stationary, travel time of light from emitter to receiver is a time T1. But, in the moving apparatus of FIG. 1, receiver 3 is receding from the beam at velocity V, so travel time T2 of light from emitter to receiver is incrementally more than T1. The time increment T2-T1 is correlative with velocity V of the moving system 1.

Figure 2:
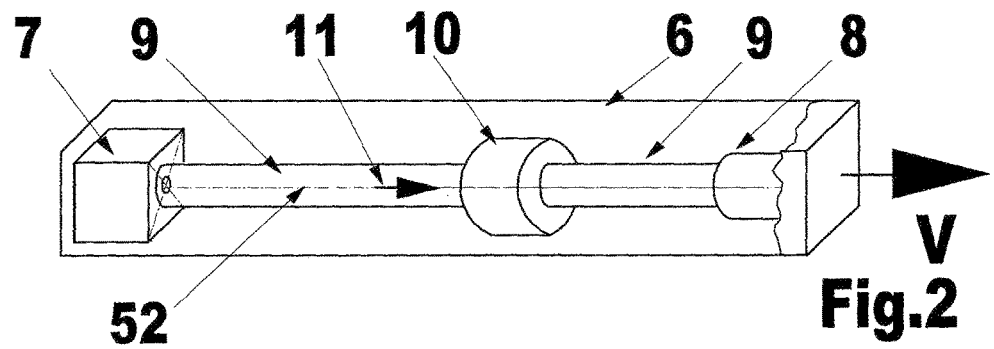
FIG. 2 is similar to FIG. 1 with a time-delay element added between emitter and receiver.

In FIG. 2, a moving system 6 includes a light emitter 7, light guide 9, optical element 10, and receiver 8, all aligned on an optical axis 52. The emitter 7 and receiver 8, a fixed distance apart, face each other along the optical axis 52. The system 6 is moving with velocity V. A light beam 11 is conducted from emitter 7 by the light guide 9 and optical element 10 to the receiver 8. The optical element 10 affects the characteristics of the light beam 11. The axis 52 is aligned with system velocity V. The optical element 10, as part of system 6 and moving with it, extends the travel time of light beam 11 tram emitter 7 to receiver 8. That travel time Is correlative with the system velocity V. The properties of optical element 10 affect die characteristics of the light beam 11.

Figure 3:
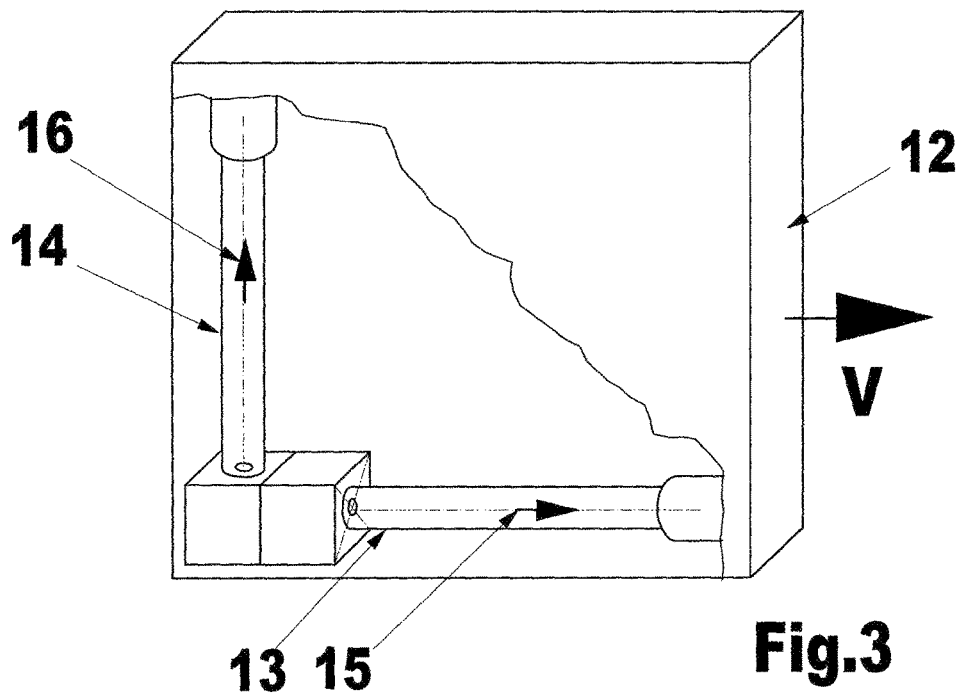
FIG. 3 shows another system in which emitter/receiver pairs are angled apart.

In FIG. 3, a moving system 12 includes a first emitter/receiver pair 13 on a first optical axis aligned with system velocity V, and a second emitter/receiver pair 14 on a second optical axis at an angle relative to the first optical axis. A light beam 15 from emitter 13 travels on the first optial axis in line with system velocity V. A light beam 16 from emitter 14 travels on the second optical axis at an angle relative to the velocity V. Both of the emitter/receiver pairs 13 and 14 are integral with system 12, so the travel tune of light beams 15, 16 to their respective receivers is correlative with the velocity V of the system 12.

Figure 4:
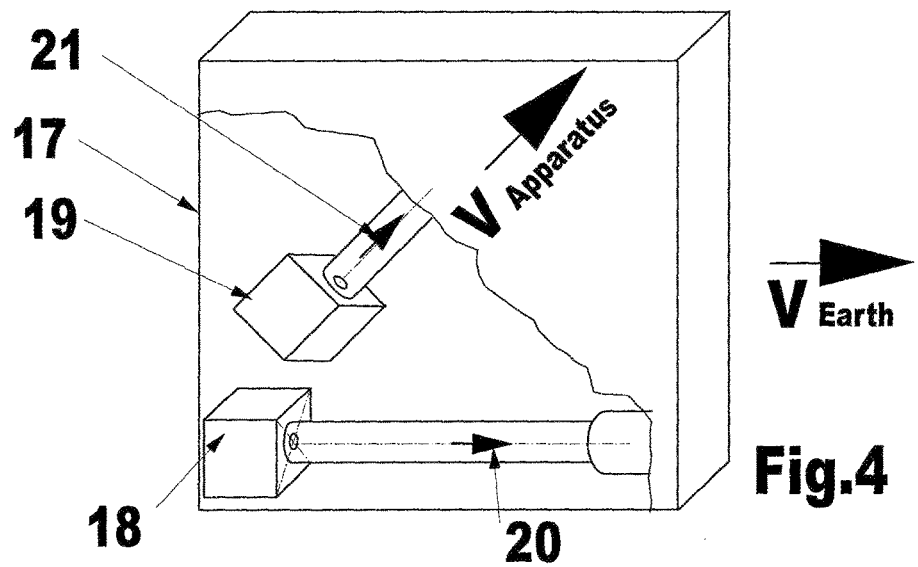
FIG. 4 shows a third system, in which one emitter/receiver pair is aligned with earth movement, and another emitter/receiver pair is aligned with its own movement.

In FIG. 4, a moving system 17 includes a first emitter/receiver pair 18 aligned with Earth directional motion, indicated as velocity Vearth, and a second emitter/receiver pair 19 aligned with system directional motion, indicated as velocity Vapp. Both emitter/receiver pairs are integral with system 17, so the travel time of light beams 20, 21 to their respective receivers is correlative with the velocity Vapp relative to the velocity Vearth.

Figure 5:
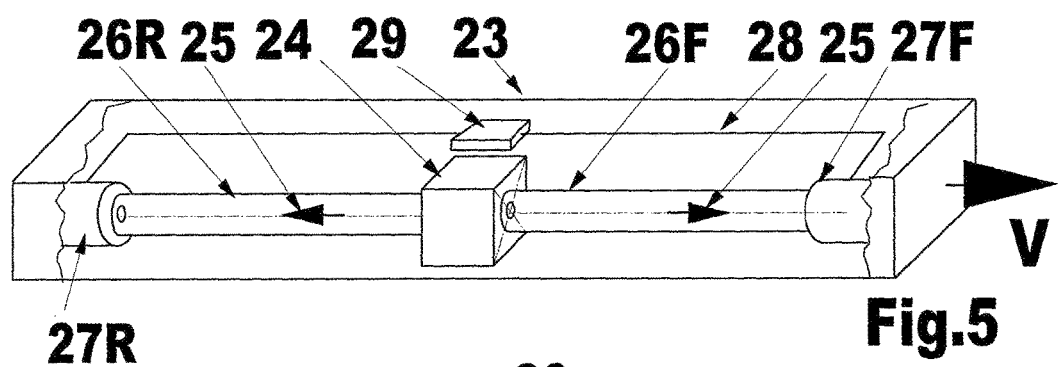
FIG. 5 shows a fourth system in which light is emitted forward and rearward in the direction of apparatus travel to respective forward and rearward receivers.

In FIG. 5, a moving system 23 includes an emitter 24 connected by forward and rearward light guides 26F, 26R respectively to forward and rearward receivers 27F, 27R, all disposed in line with directional motion V of system 23. A light beam 25 travels forward with apparatus 23, and rearward opposite the motion of apparatus 23. Forward and rearward light beams are recombined from their respective receivers for comparison of their characteristics in module 29.

Figure 6:
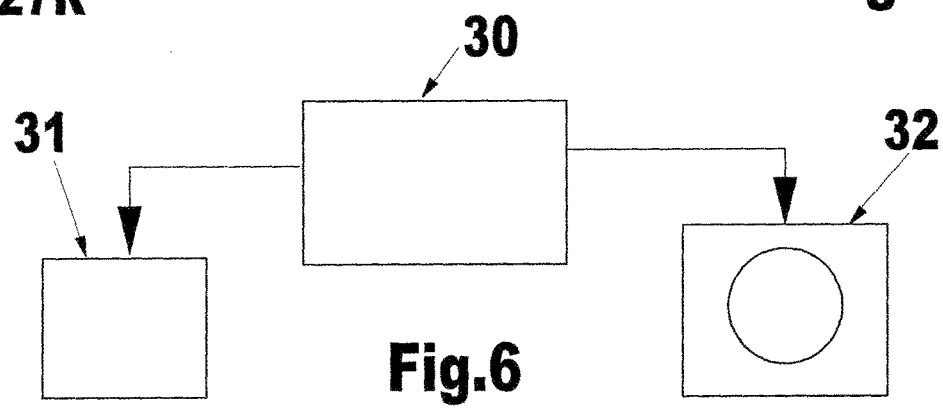
FIG. 6 is a diagram of information flow according to another aspect of this invention.

In FIG. 6, data processing apparatus 30 is connected to apparatus 31 and display apparatus 32. Real-time information on velocity measurements from systems such as FIGS. 1-5 is collected and processed by apparatus 30, and directed to apparatus 31 for guidance, and to apparatus 32 for visual or other sensible display.

The foregoing description of preferred embodiments of this invention is illustrative. The concept and scope of the invention are not limited by such details but only by the following claims. In this specification, an "Inertial body" is any body to which the system of this invention can be mounted and used; e.g. a fixture on land; a vessel on water; an aircraft in air; an object in space.

What is claimed is:
1. A self-contained system to detect and determine, from within the system itself, parameters including position, orientation, and velocity of said system relative to previous data thereof, said system including:
    an electromagnetic emitter to emit electromagnetic energy along an optical axis;
    a forward electromagnetic receiver on said optical axis at a fixed distance forward of said emitter to receive electromagnetic energy therefrom;
    a rearward electromagnetic receiver on said optical axis at a fixed distance rearward of said emitter to receive electromagnetic energy therefrom;
    a forward light guide physically connected to said emitter and said forward electromagnetic receiver to carry electromagnetic energy along said optical axis from said emitter to said forward electromagnetic receiver; and
    a rearward light guide physically connected to said emitter and said rearward electromagnetic receiver to carry electromagnetic energy along said optical axis from said emitter to said rearward electromagnetic receiver,
    wherein elapsed times of electromagnetic energy travel from said emitter to said receivers are correlative to the velocity of said system.

2. A system as defined in claim 1 wherein the forward light guide, the rearward light guide, or each of the forward light guide and the rearward light guide includes an optical element on said optical axis between said emitter and said forward or rearward electromagnetic receiver, respectively, to alter characteristics of electromagnetic energy therein.

3. A system as defined in claim 2 wherein characteristics of said electromagnetic energy at said receivers are correlative to the velocity of said system.

4. A system as defined in claim 2 wherein the optical element included in the forward light guide, the rearward light guide, or each of the forward light guide and the rearward light guide extends travel time of the electromagnetic energy from said emitter to said forward or rearward electromagnetic receiver, respectively.

5. A system as defined in claim 1 wherein said optical axis is collinear with the direction of movement of said system.

6. A system as defined in claim 1 wherein said optical axis is directed at an angle from the direction of movement of said system.

7. A system as defined in claim 1, further including a data processing apparatus communicatively connected to the forward electromagnetic receiver and the rearward electromagnetic receiver and configured by a program to determine the velocity of said system based on the elapsed time of electromagnetic energy travel.

8. A system as defined in claim 1 further comprising a recombiner optically coupled to the forward electromagnetic receiver and the rearward electromagnetic receiver to recombine first electromagnetic energy and second electromagnetic energy for determination of the elapsed times, the first electromagnetic energy emitted by the emitter through the forward light guide to the forward electromagnetic receiver and then transmitted from the forward electromagnetic receiver to the recombiner, and the second electromagnetic energy emitted by the emitter through the rearward light guide to the rearward electromagnetic receiver and then transmitted from the rearward electromagnetic receiver to the recombiner.

9. A system as defined in claim 1 further comprising means to compare characteristic information from electromagnetic energy emitted by the emitter through the forward and rearward light guides to the forward and rearward electromagnetic receivers, respectively, to determine the elapsed times.

10. The system as defined in claim 1, wherein the forward light guide is at an angle with respect to the rearward light guide.

\* \* \* \* \*